United States Patent [19]

Fukushima

[11] 4,313,133
[45] Jan. 26, 1982

[54] SCRAMBLING AND DESCRAMBLING SYSTEM IN CATV BROADCASTING SYSTEM

[75] Inventor: Jun Fukushima, Tokyo, Japan

[73] Assignee: Pioneer Electronic Corporation, Tokyo, Japan

[21] Appl. No.: 74,489

[22] Filed: Sep. 11, 1979

[30] Foreign Application Priority Data

Sep. 13, 1978 [JP] Japan .................. 53-112836

[51] Int. Cl.³ ............................................. H04N 7/16
[52] U.S. Cl. ...................................... 358/118; 358/121
[58] Field of Search ............................ 358/118, 121

[56] References Cited

U.S. PATENT DOCUMENTS

| 3,729,576 | 4/1973 | Court | 358/124 |
| 4,024,575 | 5/1977 | Harney et al. | 358/118 |
| 4,064,536 | 12/1977 | Saeki et al. | 358/118 |
| 4,145,716 | 3/1979 | Uemura et al. | 358/118 |

Primary Examiner—S. C. Buczinski
Attorney, Agent, or Firm—Fraser and Bogucki

[57] ABSTRACT

Scrambling of the television signal in a CATV broadcasting system is effected by modulating the audio signal with a pilot signal, and modulating both the audio and video with a scrambling signal of a different frequency from the pilot signal. Descrambling is accomplished by detecting the pilot and scramble signals and using each in different ways to control demodulation so as to remove the scramble component from the audio and video signals.

17 Claims, 3 Drawing Figures (a) VCO OUTPUT (b) VCO OUTPUT (÷4)

(c) VCO OUTPUT (÷6)

(d) DESIRED PHASE RELATION BETWEEN SCRAMBLE AND PILOT SIGNALS (e) OPPOSITE PHASE RELATION BETWEEN SCRAMBLE AND PILOT SIGNALS

SCRAMBLING AND DESCRAMBLING SYSTEM IN CATV BROADCASTING SYSTEM

BACKGROUND OF THE INVENTION

This invention relates to a scrambling and descrambling system for a CATV broadcasting system operable for protecting the CATV system from unauthorized reception of programs.

In a CATV broadcasting system, pay programs and noncharged programs are broadcast simultaneously. For the purpose of preventing reception of pay programs by unauthorized subscribers, the visual signals of the pay programs are altered at the transmitter by a scrambling device, and demodulated at the receiving terminal by a descrambling device.

For the realization of such a procedure, a gray sync method or the like is well known. According to this method, not only the visual signal is scrambled as described above, but also the aural signal is scramble modulated as a key signal. Although such a procedure is advantageous in that the descrambling can be carried out by comparatively simple circuitry, it is accompanied by the following problems:

A. In a terminal device, feedback circuits are used for reducing the envelope of the scrambling wave to zero. However, in order to reduce this wave to zero, a high loop gain with a high error sensitivity is required, so that the circuit tends to become unstable.

B. To eliminate this difficulty, there is a method wherein the degree of modulation is differentiated between the visual signal and the aural signal, so that when the visual signal is completely demodulated, a key signal still remains in the aural signal. However, according to this method, since the remaining signal has been preset at the scrambler, the relation between the modulations of the aural signal and the visual signal will differ from 100% coincidence. More specifically, the image quality at the demodulating side is deteriorated by the preset deviation of the aural signal portion. In addition, because detection at the demodulating side for the realization of reduction to zero of the output envelope wave is carried out by detecting a predetermined amount of the remaining key signal, the method is susceptible to the variation in characteristics of the detector and the loop circuit, thus revealing the disadvantage of instability.

SUMMARY OF THE INVENTION

With the above described disadvantages in view, the present invention seeks to provide a system resembling the gray sync and similar methods, wherein a pilot signal is added to the aural signal and the aural and visual signals are both scramblemodulated at the transmitter. Thus, the error sensitivity of the circuit can be increased, and the instability and deterioration of image quality due to variations in circuit component characteristics can be eliminated.

An embodiment of the present invention will now be described in detail with reference to the accompanying drawings.

In this embodiment, the aural signal and the visual signal are AM modulated by a scrambling signal synchronized with the horizontal synchronizing signal of the TV signal, and having a basic frequency of 31.5 KHz. A pilot signal also used for modulating the aural signal has a frequency of ⅔ times (21 KHz) the frequency of the 31.5 KHz scramble signal, and has a fixed relation in phase with the scramble signal.

DETAILED DESCRIPTION OF THE INVENTION

Figure 1:
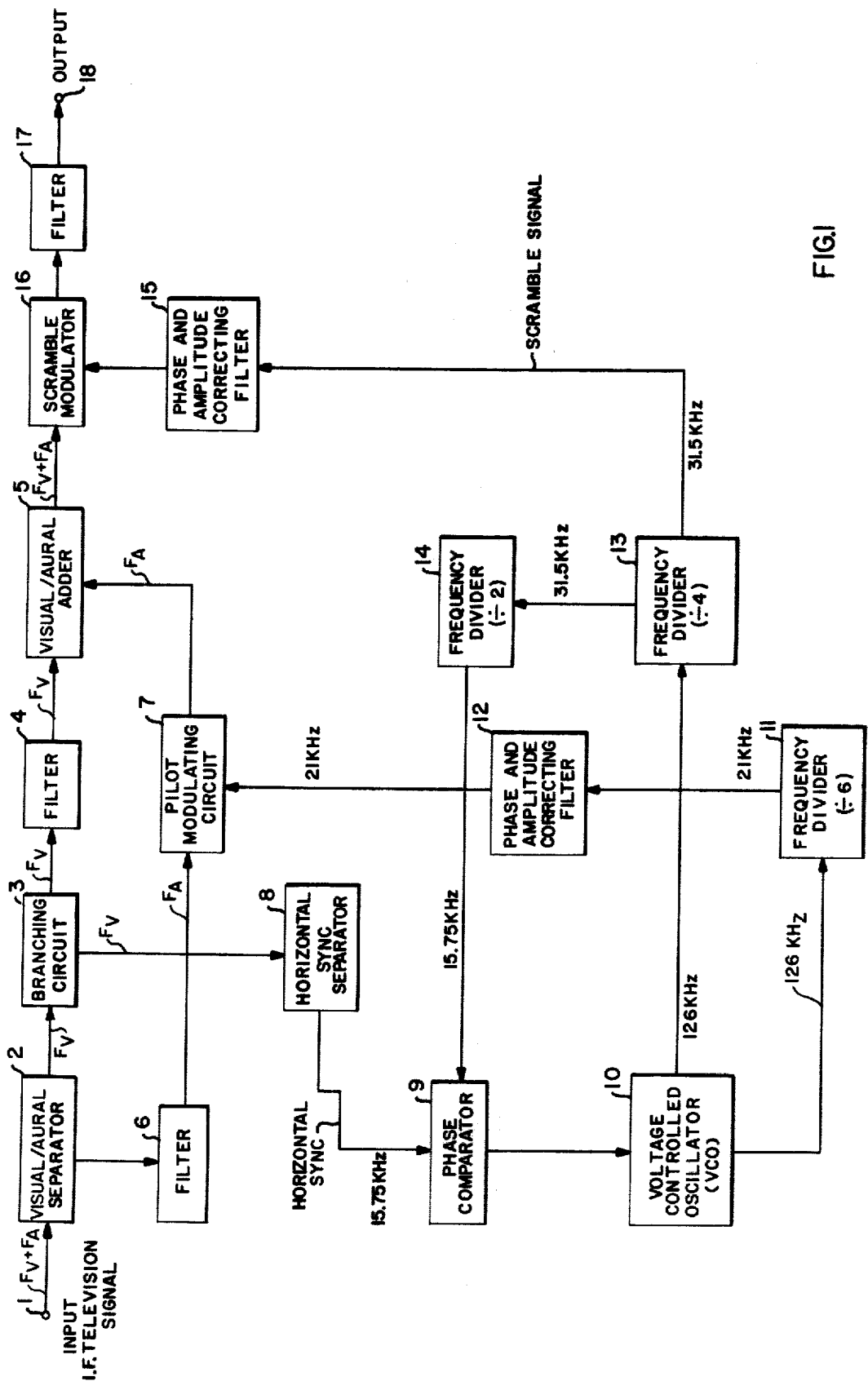
FIG. 1 is a block diagram showing an example of a scrambling device of the present invention.

FIG. 1 shows an example of the scramble circuit. From an input terminal 1 of the scrambling circuit, a TV signal converted into an intermediate frequency is introduced, and is separated in a visual/aural separating circuit 2 into a visual signal and an aural signal. The aural signal thus separated is sent through a filter 6 to remove traces of the visual signal and then to a pilot-modulating circuit 7 to be amplitude modulated by the pilot signal. The aural signal thus pilot-modulated is added back to the visual signal in a visual/aural adding circuit 5.

A portion of the visual signal from the separating circuit 2 is supplied through a branching circuit 3 into a sync separator circuit 8 for extraction of the horizontal synchronizing signal. The main visual signal from the branching circuit 3 is passed through a filter 4 to remove traces of the aural signal, and then to the visual/aural adding circuit 5. The recombined TV signal from the adding circuit 5 is amplitude modulated in a scramble modulator 16, and the output thereof is delivered through a filter 17 to an output terminal 18. The intermediate frequency output from the output terminal 18 is ordinarily upconverted into a required channel frequency.

Numeral 10 designates a voltage-controlled oscillator, the frequency of which is selected at 126 KHz. The output frequency of the oscillator 10 is divided in a ¼-frequency divider 13 into a scramble signal having a frequency of 31.5 KHz. The 31.5 KHz frequency of the scramble signal is selected to have a phase relation capable of suppressing the horizontal synchronizing signal of 15.75 KHz contained in the visual signal. The scramble signal is then subjected to the removal of higher harmonics and the adjustments of the phase and the level in a phase-correcting and modulation adjusting filter circuit 15, and is sent to the scramble-modulating circuit 16 for effecting the scrambling operation. The output of 31.5 KHz from the ¼ frequency divider 13 is further sent into a ½ frequency divider 14 to obtain 15.75 KHz, and the output of the divider 14 is sent into a phase comparator 9 (15.75 KHz can alternatively be used for the scramble signal by sending the output of divider 14 to the scramble-modulating circuit 16 with proper adjustment of filter 15.)

The horizontal synchronizing signal extracted from the visual signal by the sync separator circuit 8 through the branching circuit 3 and having a frequency of 15.75 KHz is applied to the other input of the phase comparator 9. The phase comparator 9 compares the phases of the two input signals, and delivers an output which places the voltage-controlled oscillator 10 into a phase-locked condition.

For obtaining a pilot signal, the frequency of 126 KHz of the output of the voltage-controlled oscillator 10 is divided in a 1/6-frequency divider 11 into a signal of 21 KHz held in a fixed relation in phase with the scramble signal. The output signal from the frequency divider 11 is subjected to the removal of higher harmonics and the adjustments of the phase and level in a phase correcting and modulation adjusting filter circuit 12, and the output of the filter circuit 12 is applied to a pilot-modulating circuit 7 for pilot-modulating the aural signal.

Figure 2:
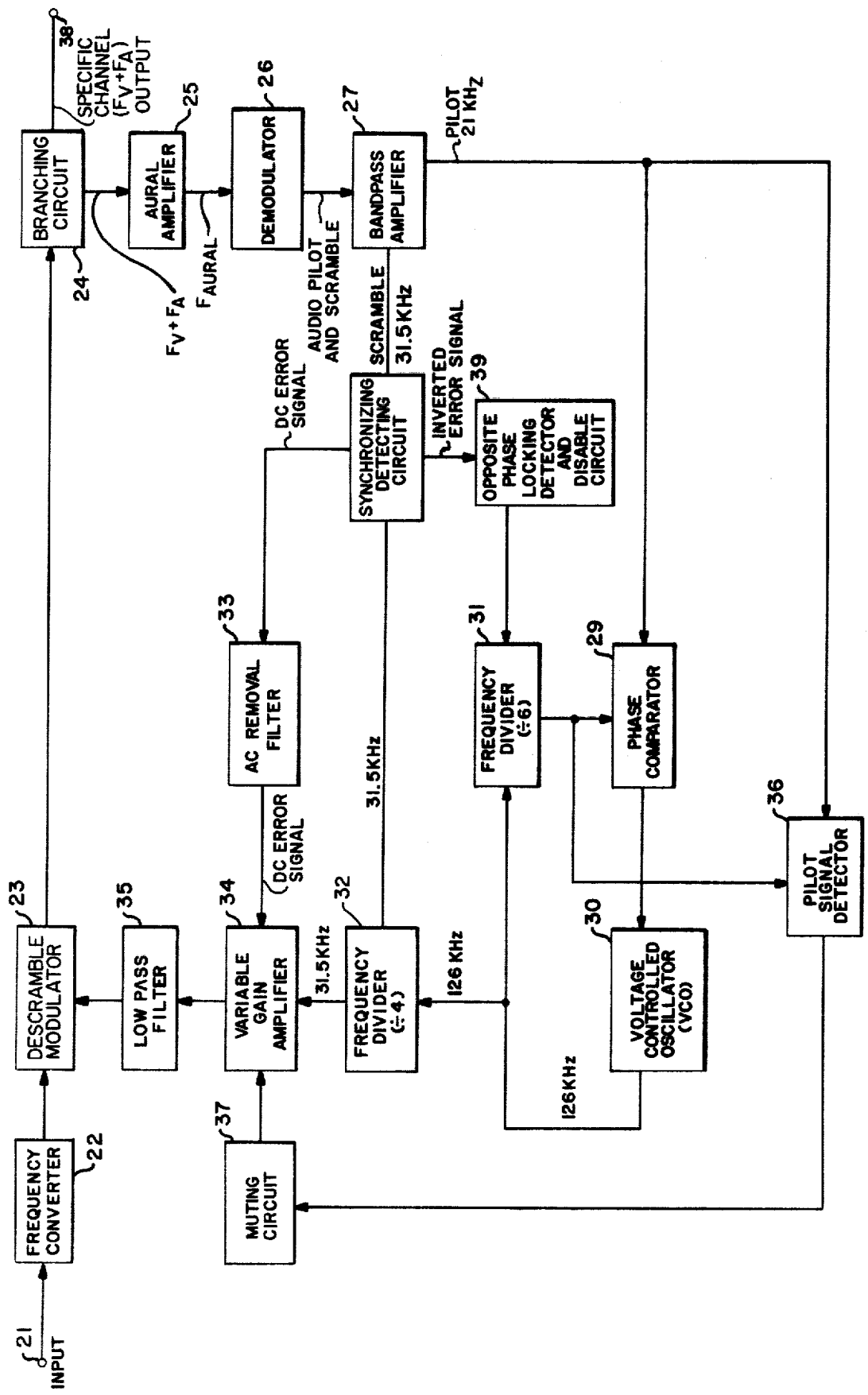
FIG. 2 is a block diagram showing an example of a descrambling device applicable to the present invention.

FIG. 2 shows an example of the descramble circuit descrambling the signals scrambled in the scrambling circuit. From an input terminal 21, TV signals representing a number of channels are introduced. A frequency converting circuit 22 converts one of the TV channels selected by the subscriber into a specific output channel frequency. The output channel TV signal of the circuit 22 is sent into a descramble modulator circuit 23 which operates if the thus introduced TV signal has been scrambled. The output of the circuit 23 is sampled through a branching circuit 24 so as to obtain the visual carrier signal and the aural carrier signal containing both pilot and scramble frequencies. The remaining part of the output of the circuit 23 passed through the branching circuit 24 is the output-channel television signal and is delivered via an output terminal 38 to a TV receiver. The aural carrier portion of the sampled signal from the branching circuit 24 is selectively amplified in an aural carrier signal amplifier 25, and is demodulated in a demodulating circuit 26 thereby obtaining a composite signal comprising the aforementioned pilot signal and scramble signal along with the normal audio signal. The pilot and scramble signals are amplified in a bandpass and amplifier 27. The pilot signal is used in a phase lock circuit for reproducing the scramble signal to be used in the descramble modulator circuit 23, and also in a muting circuit to be used for causing descrambling of an input signal only when the same signal is scrambled.

The phase lock circuit comprises a phase comparator 29, a voltage controlled oscillator 30, and a 1/6 frequency divider 31. The voltage controlled oscillator 30 delivers an output of 126 KHz as in the case of the scrambling circuit shown in FIG. 1. The frequency of the output of the oscillator 30 is reduced to 1/6 by the 1/6 frequency divider 31, and the phase of the output of the divider 31 is compared in the phase comparator 29 with that of the pilot signal obtained from the amplifier 27. The output of the phase comparator 29 is used for controlling the voltage controlled oscillator 30.

Also, the frequency of the output of the voltage controlled oscillator 30 is divided in a ¼ frequency divider 32, and the thus obtained frequency 31.5 KHz is sent into a variable gain amplifier 34 which is controlled by the meeting circuit 37 and by an error signal from a synchronizing detecting circuit 28 after passing through an AC component removing or smoothing circuit 33. Harmonic components of the output of the amplifier 34 are removed by a low pass filter 35, and the descramble signal output free from the higher harmonics is applied to the descramble modulator circuit 23.

Numeral 36 designates a pilot signal detecting circuit which receives the pilot signal from the amplifier 27 and the output of the 1/6 frequency divider 31 for measuring the synchronization therebetween. The output of the pilot signal detecting circuit 36 is sent to the muting circuit 37 for ON-OFF control of the variable gain amplifier 34. Numeral 28 designates a synchronizing detecting circuit which compares the 31.5 KHz signal from the scramble and pilot signal amplifier 27 with the output 31.5 KHz signal from the ¼ frequency divider 32, and delivers a DC error output depending on the phase relation and amplitude of the scramble signal. By the use of an AC removing filter 33, AC components are further eliminated from the DC output of the synchronizing detecting circuit 28, and the resultant DC error output is used for controlling the variable gain amplifier 34 to reduce to zero the scramble signal delivered from the amplifier 27.

Figure 3:
FIG. 3 is a waveform diagram showing the timing of the operations.
Figure 3:
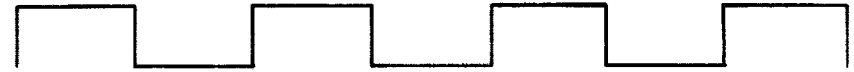
Figure 3:
Figure 3:
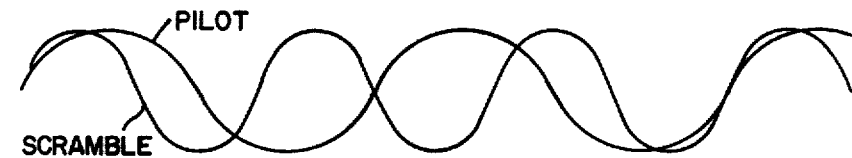
Figure 3:
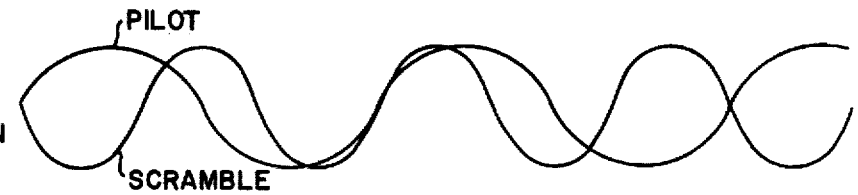

FIG. 3 shows waveform timing charts at various parts of the system. In this figure, waveform (a) indicates the output of the voltage controlled oscillator, waveform (b) the output of the ¼ frequency divider, (c) the output of 1/6 frequency divider, and waveform (d) indicates a phase relation between the scramble signal and the pilot signal. As will be apparent from waveform (e) showing a case wherein the scramble signal and the output of the frequency divider are in the opposite phase relation, the phase lock loop in FIG. 2 will lock the phase even in a phase relation shown in the waveform (e). An opposite phase locking detector 39 is therefore provided for detecting such opposite phase locking and interrupting the operation of the phase lock loop temporarily to permit return to normal phase locking.

According to the present invention the following advantageous features can be realized.

1. Because the visual and aural signals are simultaneously modulated during scrambling, the modulations for the two signals can be maintained absolutely equal, and the visual signal can also be descrambled by merely processing the aural signal in the descrambling stage.

2. Because a descrambling signal is generated by the use of the pilot signal during descrambling, the descrambling operation is extremely stable regardless of the presence of noise and circuit element variations.

3. Since in the descrambling stage, the detection of the scramble signal is carried out by a null-detecting method, the visual signal is delivered in a satisfactory and stable condition.

4. Since the null-detecting output in the descrambling loop circuit is once converted into a DC value, the operation of the loop circuit can be satisfactory and stable even in the case where the error sensitivity of the loop is increased for suppressing the effects of external noise and circuit element variations.

5. Although the pilot signal remains in the aural signal after the descrambling, harmful effects can be eliminated by selecting frequencies, as in the described example, so as to be humanly inaudible. This feature can be maintained even for a TV receiver having a low AM suppression rate, and a stable operation can be assured by the phase lock circuit regardless of the comparatively low modulation and some extent of variations in the characteristics of circuit components.

What is claimed is:

1. A scrambling and descrambling system in a CATV broadcasting system including transmitter apparatus in a CATV center and receiver apparatus in a terminal, said transmitter apparatus comprising means for modulating the aural signal in a TV signal by a pilot signal, and means for simultaneously modulating the modulated aural signal and a visual signal by a scramble signal having a frequency different from a frequency of the pilot signal and having a specific phase relationship to said pilot signal, and said receiver apparatus comprising means for detecting said pilot and scramble signals in said received input TV signal, means responsive to a descrambling signal for demodulating said input TV signal and generating a descrambled TV signal as an output, means responsive to the pilot signal for generating the descramble signal with a frequency and phase determined in response to the pilot signal, and means responsive to a residual scramble signal remaining in the descrambled TV signal for controlling the amplitude of the descramble signal to tend to reduce the magnitude of the residual scramble signal to zero.

2. A scrambling system for a television system comprising:
- a signal generating circuit generating scramble and pilot signals having different frequencies and a predetermined phase relationship;
- a pilot modulating circuit responsive to the pilot signal and coupled to modulate at least a component of a television signal with the pilot signal to generate a pilot modulated television signal; and
- a scramble modulating circuit responsive to the scramble signal and coupled to modulate at least a component of the television signal with the scramble signal in a way that interferes with normal reception of the television signal to generate a scrambled television signal.

3. The scrambling system according to claim 2 above, wherein the scramble and pilot signals have a predetermined frequency ratio of 3:2.

4. The scrambling system according to claim 2 above, wherein the scramble and pilot signals have a phase relationship which produces periodic simultaneous zero amplitude crossings.

5. The scrambling system according to claim 4 above, wherein the scramble signal has a frequency of approximately 31.5 KHz and the pilot signal has a frequency of approximately 21 KHz.

6. The scrambling system according to claim 5 above, further comprising means responsive to the horizontal sync signal of the television signal for maintaining the scramble signal in a fixed phase relationship to the horizontal sync signal.

7. The scrambling system according to claims 2 or 6 above, wherein the pilot modulating circuit modulates the aural component of the television signal in a way that does not interfere with normal reception of the television signal.

8. The scrambling system according to claim 7 above, wherein the scramble modulating circuit amplitude modulates both the visual and aural components of the television signal.

9. A descrambling system for a received television signal that is scrambled by modulating a component of the television signal with a pilot signal that has a given frequency and that does not interfere with normal reception of the television signal and by modulating a component of the television signal with a scramble signal that has a frequency different from the given frequency of the pilot signal and that does interfere with normal reception of the television signal, the scramble and pilot signals having a predetermined frequency and phase relationship that permits generation of a descramble signal in response to the pilot signal, the descrambling system comprising:
- a descramble modulator coupled to descramble the received television signal in response to the descramble signal and generate a descrambled television signal as an output;
- a descramble signal generating circuit coupled to generate the descramble signal with a phase and frequency determined in response to the pilot signal; and
- an amplitude control circuit responsive to the amplitude of a residual component of the scramble signal remaining with the descrambled television signal, the amplitude control circuit being coupled to control the amplitude of the descramble signal to tend to reduce the residual component of the scramble signal to zero.

10. The descrambling system according to claim 9 above, further comprising a pilot signal detector responsive to the occurrence of the pilot signal in the received television signal for enabling the operation of the descrambling system only when the pilot signal is present.

11. The descrambling system according to claim 9 above, further comprising an opposite phase detector circuit coupled to detect the generation of the descramble signal in a phase relation to the scramble signal which does not permit descrambling and to generate a control signal in response thereto which is coupled to the scramble signal generating circuit to change the phase relationship.

12. The descrambling system according to claim 9 above, wherein the pilot signal is carried by the aural component of the received television signal and the descramble signal generating circuit generates the descramble signal in response to the aural component of the received television signal.

13. The descrambling system according to claim 12 above, wherein the descramble signal generating circuit is responsive to the aural component of the descrambled television signal.

14. The descramble system according to claim 9 above, wherein the pilot signal has a frequency of approximately 21 KHz.

15. The descramble system according to claims 8 or 14 above, wherein the scramble signal has a frequency of approximately 31.5 KHz.

16. The descramble system according to claim 9 above, wherein the amplitude control circuit includes a variable gain amplifier receiving the descramble signal as an amplifier input and having a gain which varies according to the residual component of the scramble signal.

17. The descramble system according to claim 9 above, wherein the amplitude control circuit is responsive to the residual component of the scramble signal remaining with the aural component of the descrambled television signal.

* * * * *